US008432557B2

(12) United States Patent
Miyata

(10) Patent No.: US 8,432,557 B2
(45) Date of Patent: Apr. 30, 2013

(54) INFORMATION PROCESSING APPARATUS FOR IDENTIFYING DIFFERENCES BETWEEN DISPLAY DATA AND DRIVER DATA AND COMPUTE PROGRAM FOR INFORMATION PROCESSING APPARATUS

(75) Inventor: Yuji Miyata, Kitanagoya (JP)

(73) Assignee: Brother Kogyo, Kabushiki Kaisha, Nagoya-shi, Aichi-ken (JP)

( * ) Notice: Subject to any disclaimer, the term of this patent is extended or adjusted under 35 U.S.C. 154(b) by 82 days.

(21) Appl. No.: 13/043,997

(22) Filed: Mar. 9, 2011

(65) Prior Publication Data

US 2011/0242567 A1    Oct. 6, 2011

(30) Foreign Application Priority Data

Apr. 5, 2010  (JP) ................................. 2010-087039

(51) Int. Cl.
*G06F 3/12* (2006.01)
(52) U.S. Cl.
USPC ........... 358/1.13; 358/1.9; 715/255; 715/273; 715/274
(58) Field of Classification Search ........... 358/1.1–3.29
See application file for complete search history.

(56) References Cited

U.S. PATENT DOCUMENTS

| 6,927,865 | B1 | 8/2005 | Kujirai et al. |
| 2006/0221085 | A1* | 10/2006 | Yamada ........................ 345/501 |
| 2009/0213408 | A1* | 8/2009 | Miyata ........................ 358/1.13 |

FOREIGN PATENT DOCUMENTS

| JP | 2001-067347 | 3/2001 |
| JP | 2003-091402 | 3/2003 |

* cited by examiner

*Primary Examiner* — Benny Q Tieu
*Assistant Examiner* — Marcellus Augustin
(74) *Attorney, Agent, or Firm* — Banner & Witcoff, Ltd.

(57) ABSTRACT

An information processing apparatus connectable to a printing apparatus which prints an image on a recording medium, including: a display; a storage device which stores an application program which generates an image data of the image as a display data to be displayed on the display, and a printer driver which generates a driver data to be transmitted to the printing apparatus based on the display data generated by the application program; a controller which includes a display-data acquiring section which acquires the display data from the application program, a driver-data acquiring section which acquires the driver data from the printer driver, and a comparing section which compares the display data acquired by the display-data acquiring section and the driver data acquired by the driver-data acquiring section, and the controller displays a comparison result by the comparing section on the display.

11 Claims, 14 Drawing Sheets

INFORMATION PROCESSING APPARATUS FOR IDENTIFYING DIFFERENCES BETWEEN DISPLAY DATA AND DRIVER DATA AND COMPUTE PROGRAM FOR INFORMATION PROCESSING APPARATUS

CROSS REFERENCE TO RELATED APPLICATION

The present application claims priority from Japanese Patent Application No. 2010-087039, filed on Apr. 5, 2010, the disclosure of which is incorporated herein by reference in its entirety.

BACKGROUND OF THE INVENTION

1. Field of the Invention

The present invention relates to an information processing apparatus having a print preview function, and a computer program which executes a print preview process.

2. Description of the Related Art

Conventionally, at the time of giving an instruction to the printer from an information processing apparatus which is connected to a printer which carries out printing, via a printer driver, the printer driver creates data for transmitting to a printer, based on a drawing command which has been transmitted from an application program of the information processing apparatus to the printer driver. Furthermore, in U.S. Pat. No. 6,927,865 (corresponds to Japanese Patent Application Laid-open No. 2001-67347), a printing control system having a function called as a print preview in which, for carrying out printing desired by a user, a print result created by a printer driver is displayed on a display of an information processing apparatus before giving an instruction for printing by a printer, has been displayed.

SUMMARY OF THE INVENTION

In the abovementioned technology, since it is possible for the user to know a print result created by the printer driver before giving the instruction for printing, it is possible to avoid printing which is not desired by the user. However, generally, since the user checks the print preview after finishing editing of display which has been displayed on a display, a possibility that the display data which has been checked during editing is the print result desired by the user is high. Therefore, when there is a difference between an image of the display data and an image of the print preview, when the user carries out a final check of the image of the print preview before giving the instruction for printing, there is a possibility that the difference is overlooked. Moreover, when the printing is carried out upon overlooking the difference, sometimes the user carries out printing which has not been desired. Furthermore, in a case of a printer driver which is not capable of creating the print preview at all, there is no chance for checking data subjected to printing which has been created by the printer driver. Consequently, when the display data and the data to be created by the printer driver differ, there is possibility that a print result of data created by the printer driver differs from a print result which has been desired by the user.

The present invention has been made to solve the abovementioned problems, and an object of the present invention is to raise a possibility of being capable of carrying out printing desired by a user by using display data which is displayed on a display, and a drawing image data which is generated by a printer driver.

According to a first aspect of the present invention, there is provided an information processing apparatus which is connectable to a printing apparatus which prints an image on a recording medium, including: a display; a storage device which stores an application program which generates an image data of the image as a display data to be displayed on the display, and a printer driver which generates a driver data to be transmitted to the printing apparatus based on the display data generated by the application program; a controller which includes a display-data acquiring section which acquires the display data from the application program, a driver-data acquiring section which acquires the driver data from the printer driver, and a comparing section which compares the display data acquired by the display-data acquiring section and the driver data acquired by the driver-data acquiring section to judge whether there is a difference between the display data and the driver data or not, wherein the controller displays an information about the difference on the display based on a judgment of the comparing section.

According to a second aspect of the present invention, there is provided a computer program which makes the information processing apparatus according to the first aspect of the present invention execute steps including: a display-data acquiring step of acquiring the display data from the application program; a driver-data acquiring step of acquiring the driver data from the printer driver; a comparison step of comparing the display data which has been acquired at the display-data acquiring step and the driver data which has been acquired at the driver-data acquiring step to judge whether there is a difference between the display data and the driver data or not; and a display step of displaying an information about the difference on the display based on a judgment at the comparison step.

According to the first aspect and the second aspect of the present invention, since the information about the difference between the display data and the driver data is displayed on the display, it is possible to raise a possibility of obtaining a print result desired by a user.

DETAILED DESCRIPTION OF THE PREFERRED EMBODIMENTS

Exemplary embodiments of the present invention will be described below by referring to the accompanying diagrams.

A PC 30 includes a CPU (central processing unit) 31 (a controller including a display-data acquiring section, a driver-data acquiring section, a comparing section, a edit section, a judging section, and so on) which carries out an integrated control of various sections in an apparatus by executing various computer programs, an ROM (read only memory) 32 which stores computer programs such as a boot (computer) program which is to be executed by the CPU 31, and an RAM (random access memory) 33 which is to be used as a work area at the time of executing a computer program by the CPU 31. Furthermore, the PC 30 includes a hard disc device (HDD) 34 which stores computer programs such as a printer driver, and various data, a display 41 (an example of a display according to the present invention) such as a liquid crystal monitor, for displaying information, an input section 42 (an example of a selecting section according to the present invention) such as a keyboard and a pointing device, which a user can operate, and a printer-port interface (a so-called LAN interface) 43 which is connected to a LAN (local area network).

A multi-task OS (operating system) (such as WINDOWS (registered trademark) which is capable of carrying out parallel processing of a plurality of tasks, is stored as an operating system in the hard disc device 34, and the CPU 31 manages (controls) a task by the multi-task OS.

Figure 6:
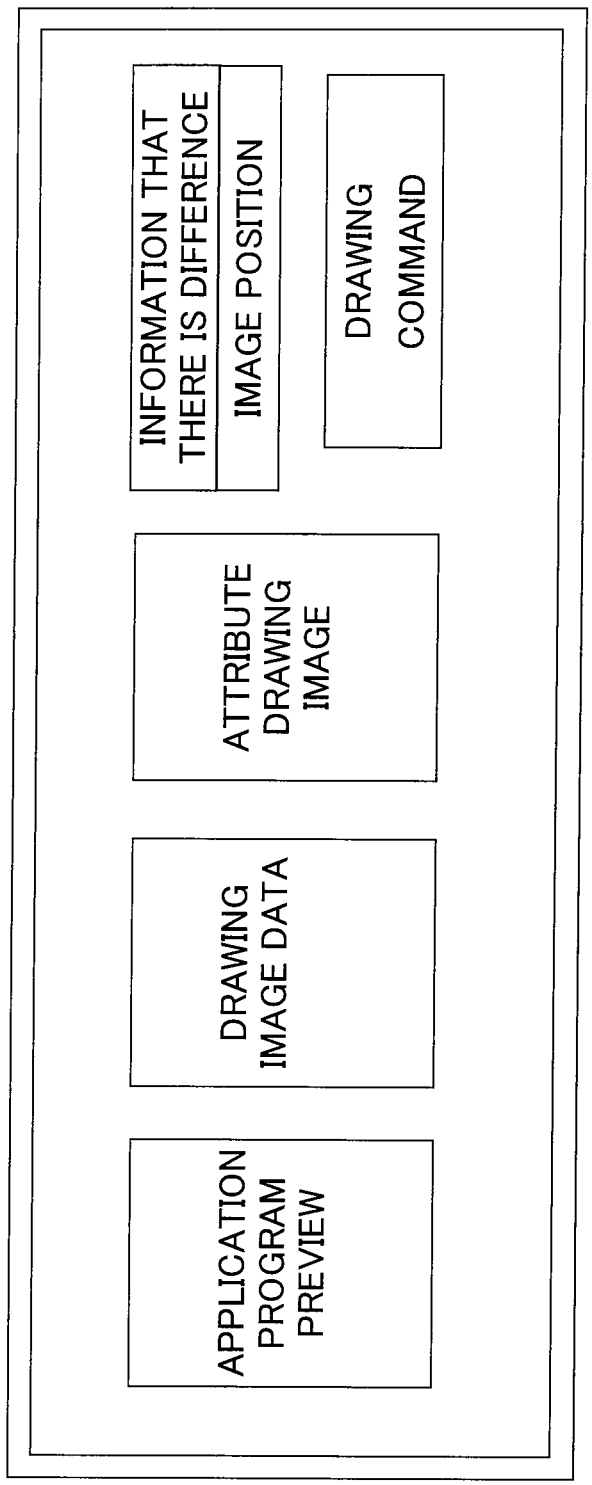
FIG. 6 is a diagram in which data in an RAM 13 is shown conceptually.

The RAM 33, during a preview process that will be described later, stores schematically as shown in FIG. 6, a drawing command from an application program, a bit having information that there is a difference and an image position of the bit having information that there is a difference, an attribute drawing image, a drawing image data, and an application program preview that will be described later in detail.

Besides this, the printer driver according to the first embodiment is formed as a computer program component (a so-called DLL (Dynamic Link Library) which is shared by a plurality of application programs. In other words, the printer driver is activated upon being called from the application program by inputting a print instruction by a user to the application program which the CPU 31 has executed in the multi-task OS.

Next, an operation of the information processing apparatus 30 will be described below.

Figure 1:
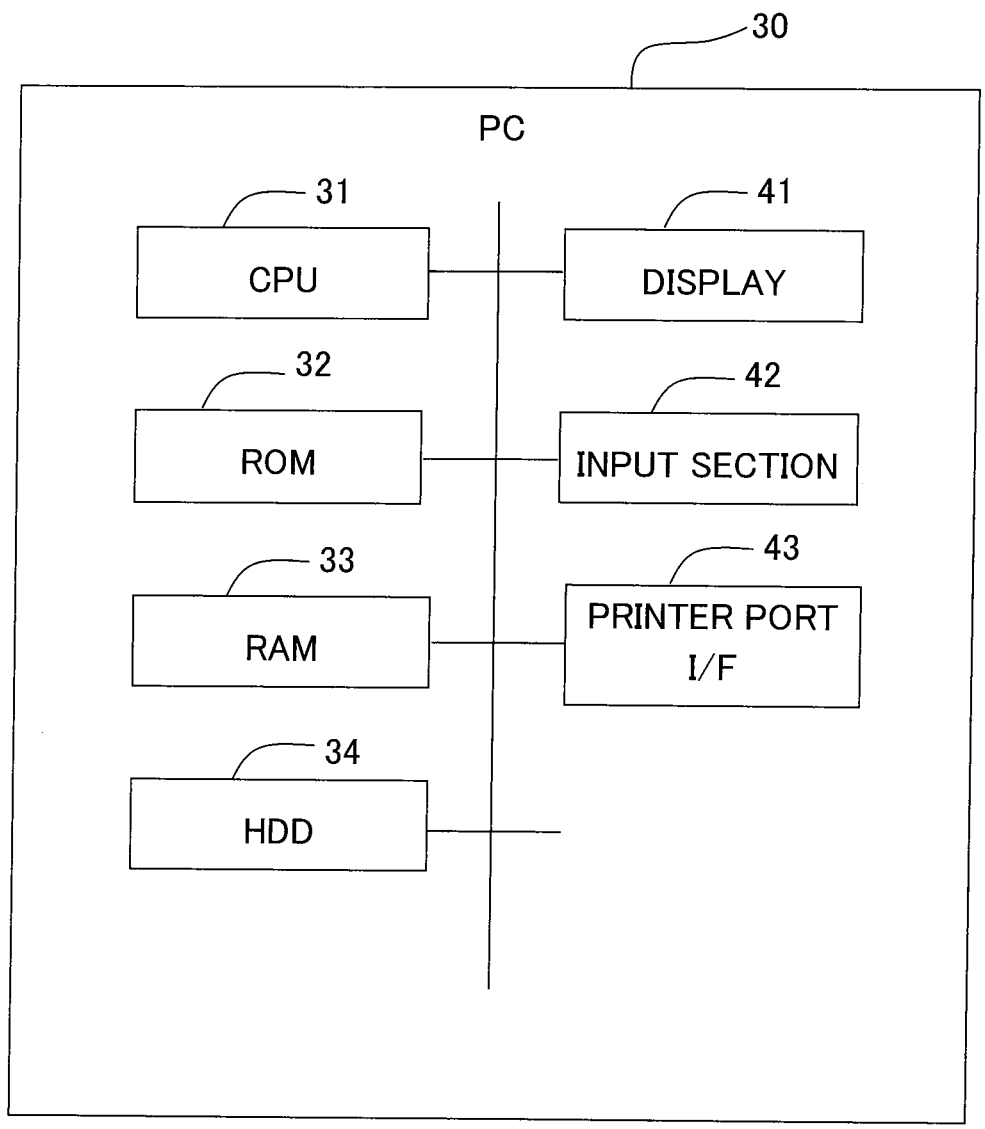
FIG. 1 is a block diagram showing a structure of a personal computer to which the present invention is applied.
Figure 2:
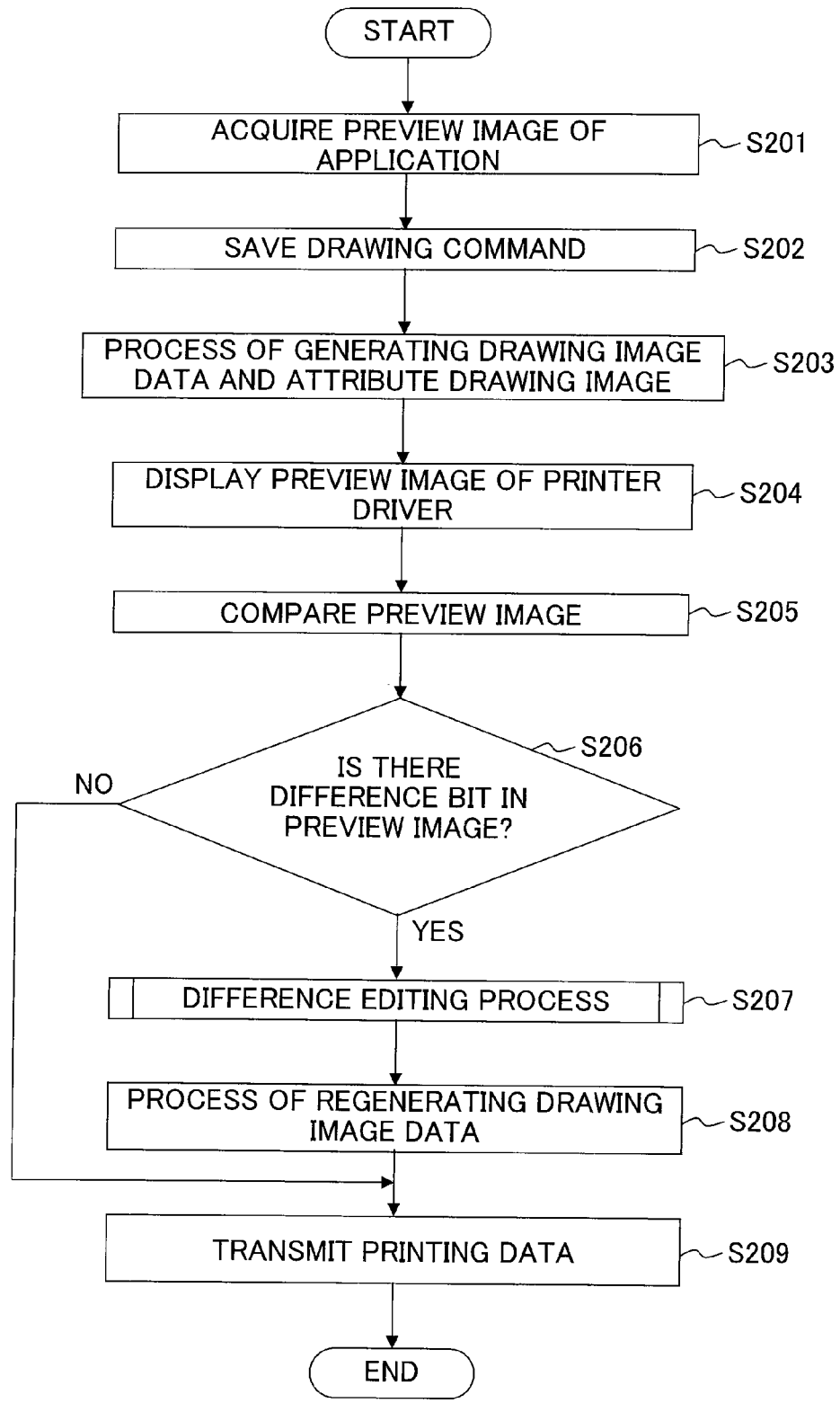
FIG. 2 is a flowchart in which a flow of a printing process with verification of a print result is shown.
Figure 3:
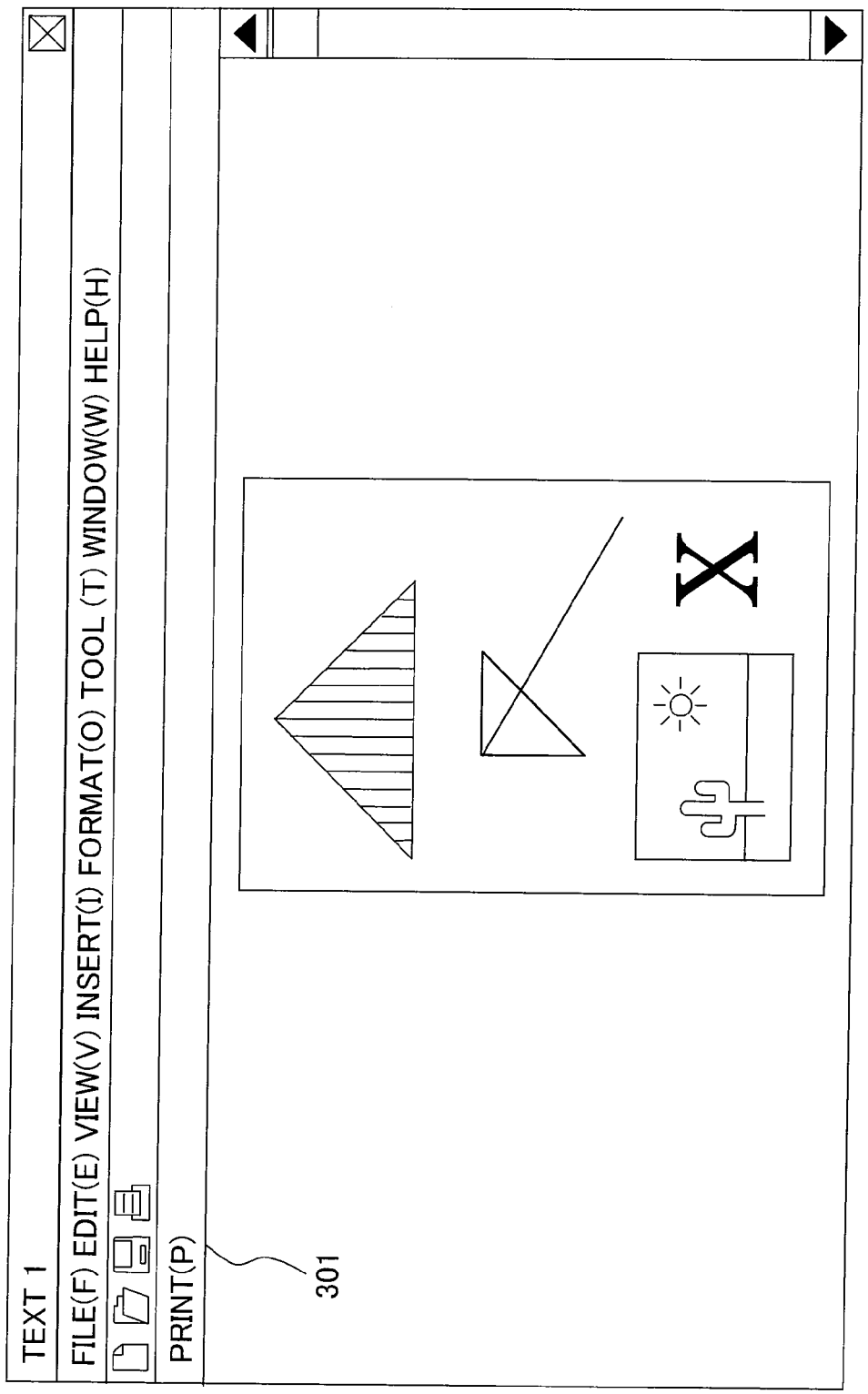
FIG. 3 is a concrete example of an add-on screen.

A printing process with a verification of print result shown in FIG. 2 starts when the CPU 31 has detected that the user has pressed a print button 301 (an example of an instruction section according to the present invention) by operating the input section 42. The print button 301 is added-on to (incorporated in) the application program as shown in FIG. 3, and by the user giving an instruction directly from the application program, the printing process with a verification of print result is executed.

Figure 5:
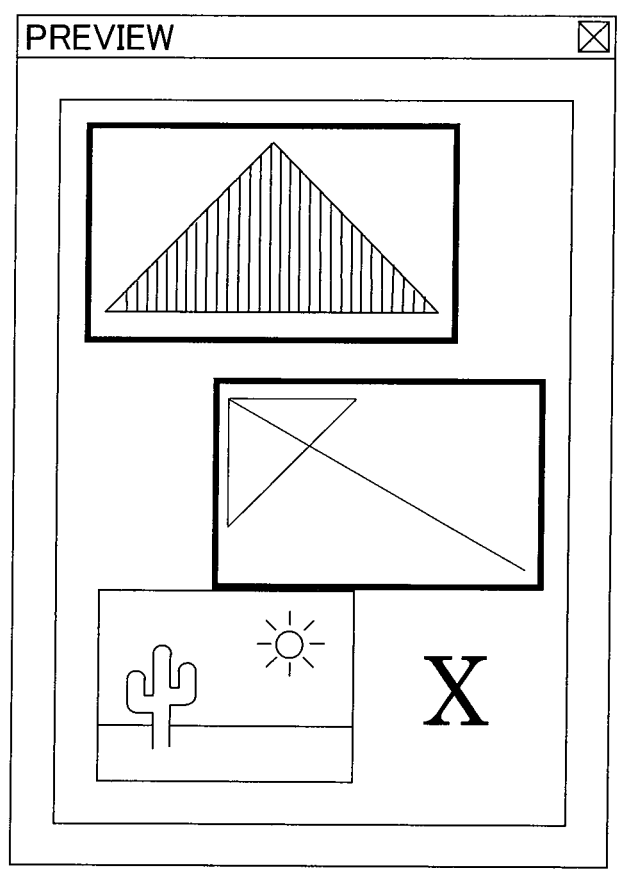
FIG. 5 is a concrete example of a preview screen showing a state in which there is a difference.

When the printing process with a verification of print result is started, first of all, the CPU 31 acquires a preview image (hereinafter, let to be an application program preview, and is an example of display data according to the present invention) which is generated in the application program shown in FIG. 5 (step S201), and the CPU 31 receives a drawing command from the application program, and saves (preserves) in the RAM 33 (step S202). The drawing command is a command which is to be sent from the application program to the printer driver, and is a command for generating an attribute drawing image and drawing image data that will be described later.

Figure 7:
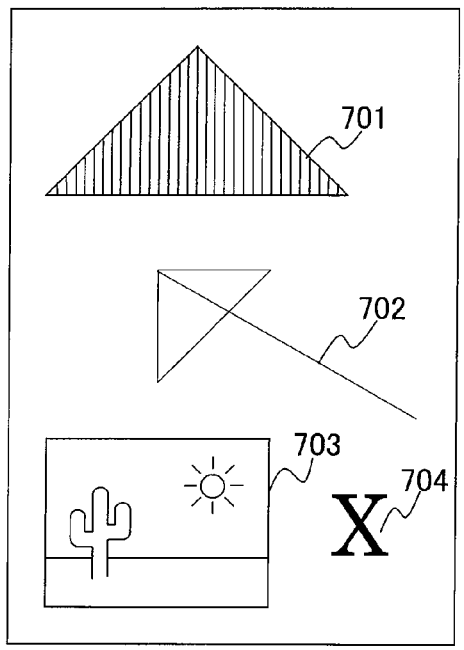
FIG. 7 is a concrete example of drawing image data which is to be generated by a printer driver.
Figure 8:
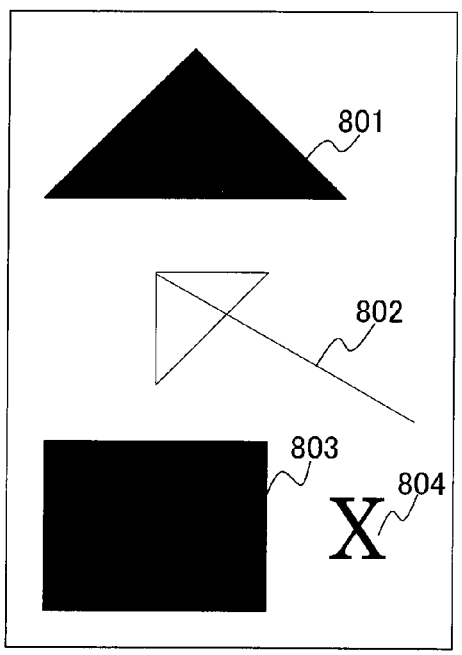
FIG. 8 is a concrete example of attribute drawing image.

Next, a process for generating the drawing image data (an example of driver data according to the present invention) and the attribute drawing image is carried out based on the drawing command saved in the RAM 33 (step S203). In the process for generating the drawing image data and the attribute drawing image, the drawing image data to be generated in the printer driver shown in FIG. 7, and the attribute drawing data shown in FIG. 8 are generated. The attribute drawing image is an image for judging an attribute of the drawing image. Details of the drawing image data and the attribute drawing data of the step S203 will be described later.

Next, the CPU 31, in the process of generating the drawing image data and the attribute drawing image (step S203), displays the drawing image data which has been generated by the printer driver, by the display 41 as a preview image (step S204). Moreover, the CPU 31 compares the application program preview and the drawing image data (step S205). The application program preview shown in FIG. 4 and the drawing image data shown in FIG. 7 are formed of one or more drawing images, and both are images formed by bit-map data.

In the comparison at step S205, the comparison is made by (making a judgment of) whether or not a bit which forms the application program preview at an image position to be compared and a bit which forms the drawing image data form the same bit at respective image positions to be compared.

Concretely, a bit structure for each bit is judged one after another from an upper end at an extreme left of each preview image toward right side, and a structure of bits at the same position of the application program preview and the drawing image data are compared. This is carried out up to a right upper end, and comparison for one row (line) is completed. Thereafter, the comparison is carried out from a left end of a row right below for which the comparison is not completed, to a right end, by a method similar to the abovementioned method of comparison. In this manner, by comparing for each row, the structure of bits for one page of the preview image is compared. At the time of comparison at step S205, when a size of the application program preview and a size of the drawing image data differ, the comparison is made by matching the scale size (reduced scale).

When as a result of the comparison, the bit which is to be displayed to be white in the application program preview is indicated to be black in the drawing image data, a color of the bit to be displayed differs. Therefore, it is judged to be different, and information that "there is a difference (disparity)" is stored in the RAM 33 together with an image position. The bit with the difference is called as a "difference bit". Whereas, when both the bit of the application program preview and the bit of the drawing image program are white bits, a judgment that there is no difference is made, and information that "there is a difference" and the image position are not stored in the RAM 33. This process is to be executed for each bit.

Next, the CPU 31 makes a judgment whether there is a difference between the application program image and the drawing image data or not (step S206). Concretely, when the difference bit is stored in the RAM 33, the CPU 31 makes a judgment that there is a difference in the preview image (YES at step S206), and when the difference bit is not stored in the RAM 33, the CPU 31 makes a judgment that there is no difference in the preview image (NO at step S206).

When the CPU 31 has made a judgment that there is no difference bit in the application program preview and the drawing image data (NO at step S206), the CPU 31 converts the drawing image data to a PDL (Page Description Language), and transmits a print command together with the PDL to a printing apparatus (step S209), thereby ending the printing process with a verification of print result.

When the CPU 31 has made a judgment that there is a difference bit in the application program preview and the drawing image data (YES at step S206), the CPU 31 processes a drawing command (step S207) by executing a difference editing process, and executes a process of regenerating the drawing image data by using the drawing command (step S208). Moreover, the CPU 31 converts the drawing image data which has been regenerated at step S208 to the PDL, and transmits the print command together with the PDL to the printing apparatus (step S209), thereby ending the printing process with verification of print result. The difference editing process will be described later.

Next, the process of generating the attribute drawing image and the drawing image data shown at step S203 in FIG. 2 will be described below.

Firstly, as the process of generating the attribute drawing image and the drawing image data starts, the CPU 31 secures a drawing image data area for saving the drawing image data generated in the printer driver shown in FIG. 7 in the RAM 33, and also secures an attribute drawing image area for saving the attribute drawing image shown in FIG. 8 in the RAM 33.

Next, the CPU 31 executes a drawing process of a drawing command which has been received from the application program, and draws a drawing image of one page portion (equivalent to one page) in the drawing image data area. For instance, the CPU 31 executes the drawing process from the drawing command which has been saved in the RAM 33 at step S202 in FIG. 2, and draws a pattern drawing image shown in 401 in FIG. 4 in the drawing image data area of the printer driver in the RAM 33. Thus, the pattern drawing image shown in 701 in FIG. 7 is drawn in the drawing image data area of the RAM 33. All the drawing images which have been drawn are converted to bit map.

Next, the CPU 31 executes the process of generating the attribute drawing image of one page portion (equivalent to one page) of the drawing command. In the process of generating the attribute drawing image, a drawing area which is formed by the same drawing image as the drawing image drawn in the drawing image data area, is formed in the attribute drawing image area. The drawing area is filled (daubed) by a characteristic value (an eigen value). For instance, as the CPU 31 distinguishes the 701 in FIG. 7 as a pattern drawing image, the CPU 31 forms a drawing area formed by a drawing image same as the drawing image of 701 in FIG. 7 in the attribute drawing image area of the RAM 33, and an attribute drawing image area of 801 in FIG. 8 is formed by filling with a characteristic value corresponding to the pattern drawing.

For generating the attribute drawing image, it is necessary that the CPU 31 distinguishes a type of drawing in the drawing command (including information such as a type of drawing), and parameters of color and thickness), and divides into categories. Here, there is a plurality of types of commands such as a pattern drawing, a line drawing, picture, and characters in the category, and each has a characteristic value.

Concretely, at the time of executing a drawing process of the drawing command which has been received from the application program, the attribute drawing image is filled with characteristic value. Moreover, by the CPU 31 judging the characteristic value of the attribute drawing image corresponding to the drawing image of the drawing image data, it is possible to judge a category of the drawing image of the drawing image data.

Figure 9A:
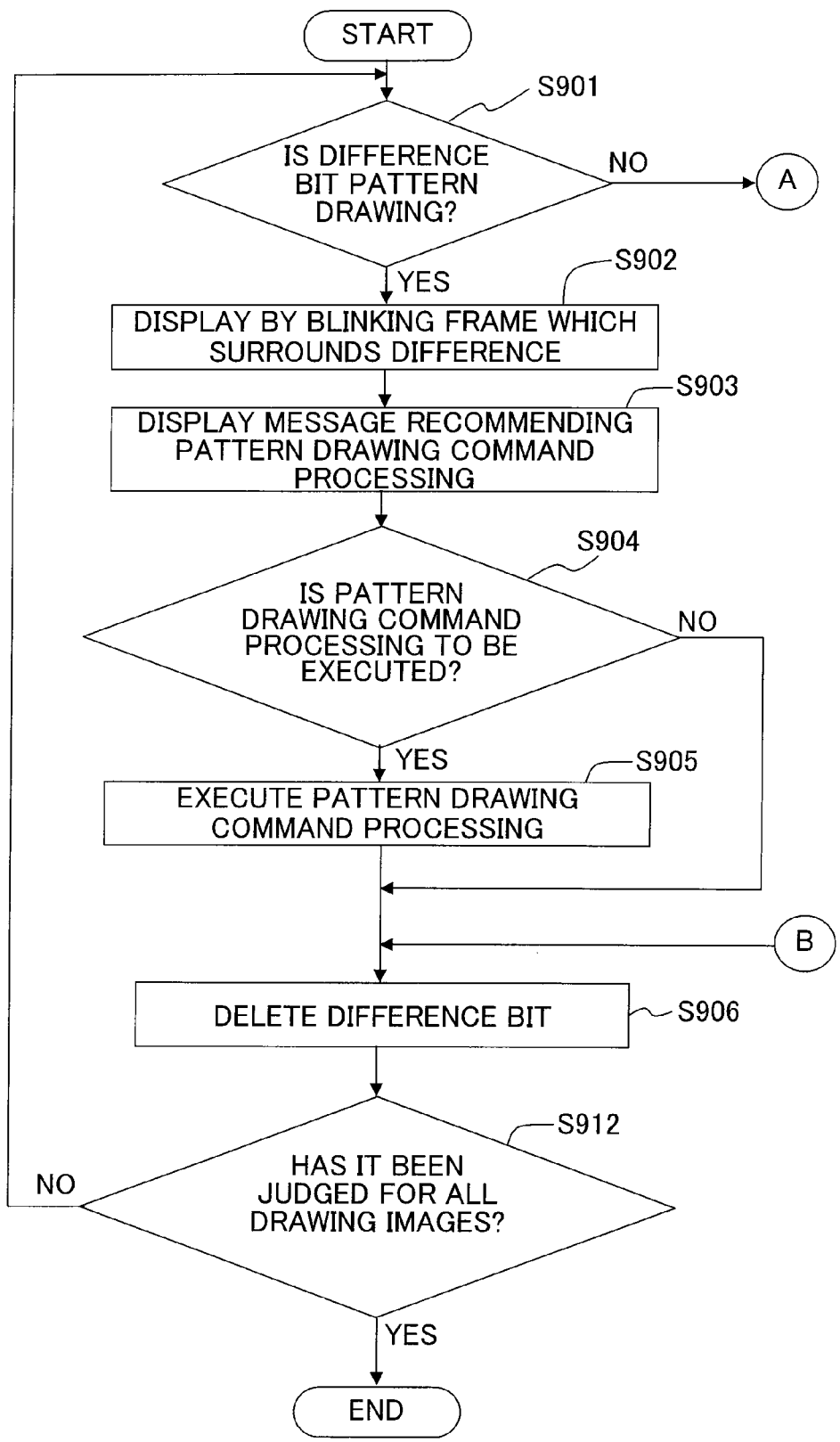
FIGS. 9A and 9B show a flowchart in which a flow of a difference editing process is shown.
Figure 9B:
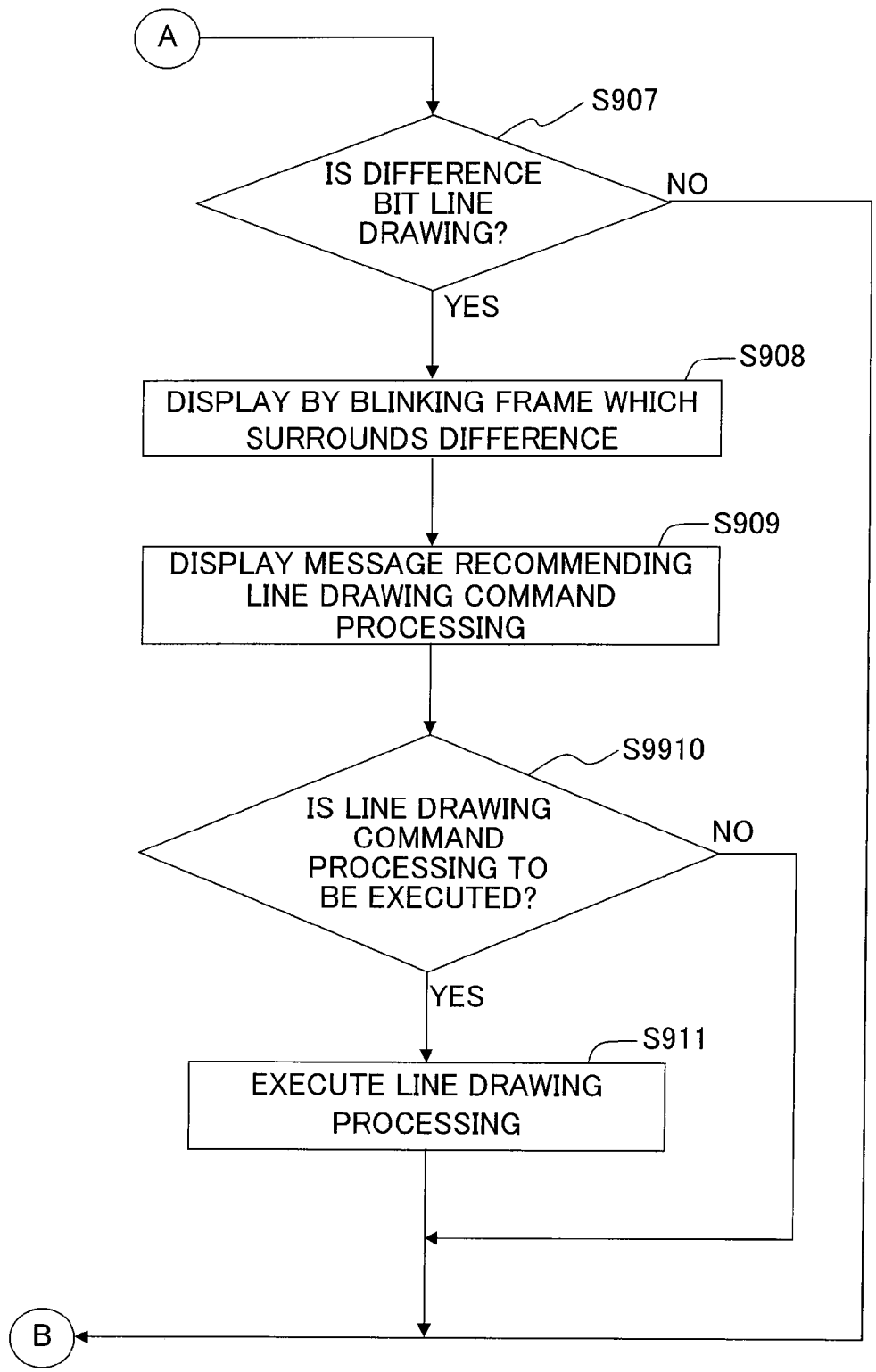

Next, the difference editing process shown at step S207 in FIG. 2 will be described below by referring to FIGS. 9A and 9B.

To start with, the CPU 31 makes a judgment of whether the difference bit saved in the RAM 33 is a pattern drawing (step S901). Concretely, the CPU 31 makes a judgment of whether it is a pattern drawing by referring to the characteristic value of the attribute drawing image including position information corresponding to position information of the difference bit. When the category judged by the characteristic value is a pattern drawing, the CPU 31 makes a judgment that there is a difference in a pattern drawing portion (YES at step S901). Whereas, when the category of a portion having a difference is not a pattern drawing, the CPU 31 makes a judgment that there is no difference in the pattern drawing portion (NO at step S901).

When the CPU 31 makes a judgment that there is a difference in the pattern drawing portion (YES at step S901), the CPU 31, based on information of image position stored in the RAM 33 together with information of "there is a difference", surrounds an area around the position having a difference in the preview image displayed on the display 41 at step S204 by a frame, and makes a blinking display of the frame (step S902).

Figure 10:
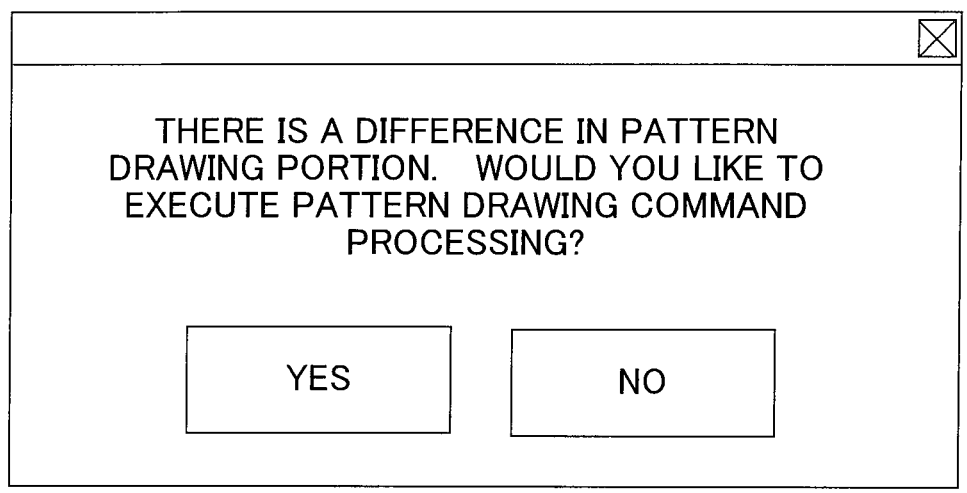
FIG. 10 is a concrete example of a pattern drawing message.
Figure 11:
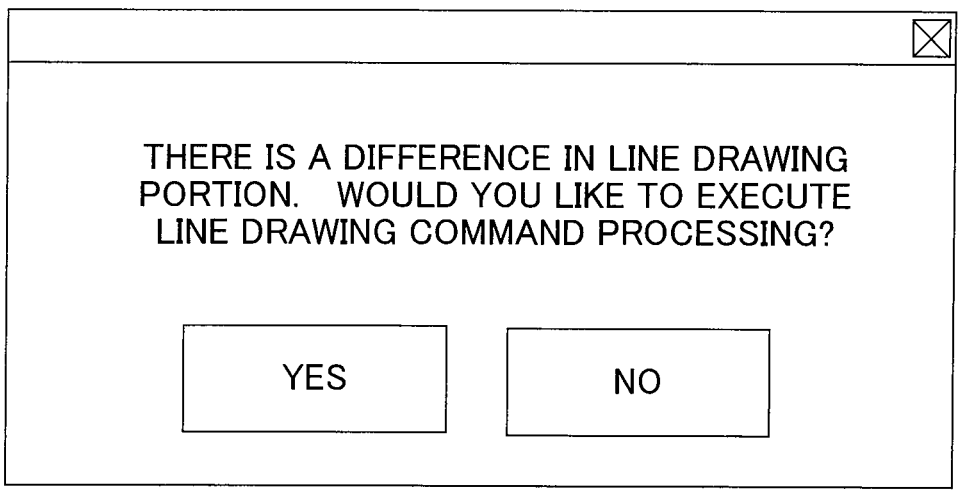
FIG. 11 is a concrete example of a thin-line drawing message.

Next, the CPU 31 displays a message of recommending a pattern drawing command processing on the display 41 (step S903). Concretely, a message recommending the pattern drawing command processing as shown in FIG. 10 is displayed. Here, according to a difference in a resolution of the printing apparatus and a resolution of the display 41, sometimes bit-map data of an interval (distance) between two lines of the application program preview and an interval (distance) between two lines of the drawing image data differ. Therefore, the pattern drawing command processing which processes the drawing command of the RAM 33 such that a print result having an interval close to the interval between the two lines of the application program preview is achieved, has been provided.

In the pattern drawing command processing, the CPU 31 reads the drawing image data and the application program preview stored in the RAM 33, and displays on the display 41.

Figure 4:
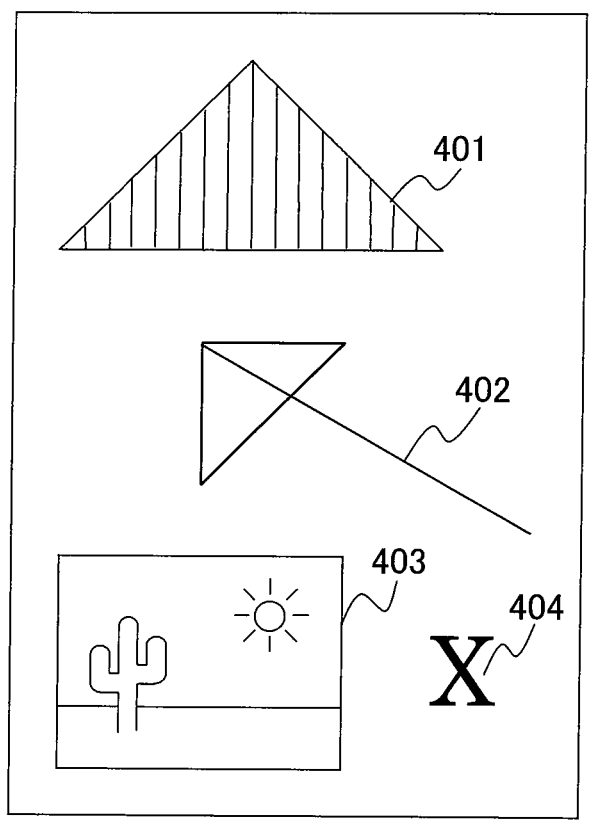
FIG. 4 is a concrete example of a preview image of an application program.

At this time, when the resolution of the display 41 is lower than the resolution of the printing apparatus, for instance, when the drawing command from the application program is a command saying "draw a triangle and draw lines having a thickness of five bits and an interval between two lines of 10 bits", even when in the application preview 15 lines have been displayed on the display 41 as shown in 401 in FIG. 4, in the drawing image data to be achieved as the print result, 31 lines are displayed on the display 41 as shown in 701 in FIG. 7.

Therefore, the printer driver processes the drawing command "draw a triangle, and draw lines having a thickness of five bits and an interval between two lines of 10 bits" form the application program to a command saying "draw a triangle, and draw lines having a thickness of 10 bits and an interval between two lines of 20 bits" such that the pattern drawing image having the interval between the two lines as in 401 in FIG. 4 is achieved. In other words, the printer driver processes the drawing command from the application program to increase the thickness of lines and widen the interval between the lines. Accordingly, it is possible to bring the drawing image data closer to the application program preview.

Next, a judgment of whether there has been an instruction for executing the pattern drawing command processing is made (step S904). When there has been the instruction for executing the pattern drawing command processing (YES at step S904), the pattern drawing command processing is executed (step S905), and thereafter, the difference bit is deleted (erased). Concretely, when the user selects "YES" in the message which recommends the pattern drawing command processing displayed on the display 41, the pattern drawing command processing is executed.

Whereas, when the pattern drawing command processing is not to be executed (NO at step S904), the difference bit is deleted without executing the pattern drawing command processing (step S906). For instance, when there is a small difference in the pattern drawing portion, and the user has given instruction that there is no need to execute the pattern drawing command processing, it is not necessary to execute the pattern drawing command processing.

Moreover, at step S901, when the category of the portion having a difference is not pattern drawing (NO at step S901), a judgment of whether the category of the portion having the difference is a line drawing is made (step S907). Concretely, the CPU 31 makes the judgment of whether the category is a line drawing by comparing a characteristic value of the attribute drawing image corresponding to the difference bit. When the category is a line drawing, the CPU 31 makes a judgment that there is a difference in a line drawing portion (YES at step S907), and when the category of the portion having a difference is not a line drawing (NO at step S907), the CPU 31 deletes the difference bit (step S906).

When the CPU 31 has made a judgment that there is a difference in the line drawing portion (YES at step S907), the CPU 31 surrounds the area around the position having a difference by a frame, and makes a blinking display of the frame (step S908), and displays a message which recommends a thin-line drawing command processing on the display 41 (step S909). Concretely, the CPU 31 displays the message which recommends the thin-line drawing command processing on the display 41 (step S909). Here, due to the difference in the resolution of the printing apparatus and the resolution of the display 41, sometimes bit-map data of the thickness of lines in the application program preview, and thickness of lines in the drawing image data differ. Therefore, the line drawing command processing of processing the drawing command of the RAM 33 is provided such that lines having a thickness close to the thickness of the application program preview are achieved as a print result.

When the resolution of the display 41 is lower than the resolution of the printing apparatus, for instance, when the drawing command from the application program is a command saying "draw a line of thickness of five bits", a line of the application drawing image thicker than a line of the drawing image data shown in 702 in FIG. 7 to be achieved as the print result is displayed on the display 41.

Therefore, the printer driver processes the drawing command "draw lines of five bits" from the application program to a command "draw lines of 10 bits" so that a line drawing image having a thickness of line as in 402 of FIG. 4 is achieved as a print result. In other words, the printer driver processes the drawing command from the application program to make the lines thick. Accordingly, it is possible to bring the drawing image data closer to the application program preview.

Next, the CPU 31 makes a judgment of whether there has been an instruction for executing a line drawing command processing (step S910). When there has been the instruction for executing the line drawing command processing (YES at step S910), the CPU 31 executes the line drawing command processing (step S911), and thereafter, deletes the difference bit (step S960). Concretely, when the user selects "YES" in the message displayed on the display 41, the CPU 31 executes the line drawing command processing.

Whereas, when the instruction for carrying out the line drawing command processing has not been there (NO at step S910), the CPU 31, without executing the line drawing command processing, deletes the difference bit (step S906). For instance, when there is a small difference in the line drawing portion, and the user has given an instruction that there is no need to carry out the line drawing command processing, it is not necessary to carry out the line drawing command processing.

At step S906, a judgment of whether the difference bit which has been judged to have a difference at step S901 or step S907 and an adjacent difference bit has the same attribute value (property value) is made. Next, even for the next adjacent bits, the judgment of whether the bit has the same attribute value is made repeatedly till a bit having a different attribute is found. When a graphic (pattern) is closed by an attribute differing from the difference bit judged by YES at step S901 or YES at step S907, a bit having position information in a range (area) adjacent to the bit having the same attribute as the difference bit which has been judged by YES at step S901 or YES at step S907 is deleted with the difference bit which has been judged at step S901 or step S907.

In other words, when a judgment of whether there has been an instruction to execute the pattern drawing command processing (step S904) is made or when a judgment of whether there has been an instruction to execute the line drawing command processing (step S910) is made, the CPU 31 deletes the difference bit from the RAM 33, and prevents the same judgment from being repeated in the same drawing image. Moreover, in a case of NO at step S907, since there is no process of processing the difference bit, the CPU 31 deletes the difference bit in the same drawing image, and prevents the same judgment from being repeated in the same drawing image.

Moreover, when the CPU 31 has made a judgment of whether it is a pattern drawing or a line drawing for all the drawing images (YES at step S912), the difference editing process is terminated. When the CPU 31 has not made a judgment of whether it is a pattern drawing or a line drawing for all the drawing images (NO at step S912), the process returns to step S901.

According to the information processing apparatus 30 having the print preview function and a computer program which makes computer execute the print preview processing, a result of comparison of the display data and the driver data is displayed on the display 41. Therefore, even when a unique application program preview created by the application program and the drawing image data generated by the printer driver differ, it is possible to raise a possibility that the user achieves the desired print result.

Moreover, since the print button 301 has been incorporated in the application program, by giving an instruction via the print button 301 in a state of the application program used by the user, it is possible to a have a comparison of the data and a result of the comparison easily.

Furthermore, when there is a difference between the application program preview and the drawing image data, by the CPU 31 displaying on the display 41 that there is a difference, it is easy for the user to realize that there is a difference.

Moreover, by executing the process for processing the drawing command for each type of drawing of the application program preview, it is possible to bring the drawing image data generated by the printer driver closer to the application program preview.

For each drawing image on the same page, by judging the type of drawing, and displaying upon switching an appropriate process for each type of drawing on the display 41 by the CPU 31, it is possible for the user to make a judgment of whether or not the processing of the drawing command is to be executed. Therefore, it is possible to provide a method of processing which enables to achieve the print result desired by the user, for each drawing image. For instance, when the user desires a processing of a pattern drawing on the same page and does not desire a processing of the line drawing, by judging the drawing type, it is possible to carry out more detailed processing.

Moreover, the display data and the driver data are data in a bit-map form (format), the CPU 31 is capable of comparing the display data and the driver data for each bit, and it is possible to judge easily whether or not there is a difference.

Next, a second embodiment of an image forming apparatus of the present invention will be described below. In the image forming apparatus of the first embodiment, the user has been determining execution of the pattern drawing command processing and the line drawing command processing. However, in the image forming apparatus of the second embodiment, the CPU 31 determines the execution of the pattern drawing command processing and the line drawing command processing.

Figure 12:
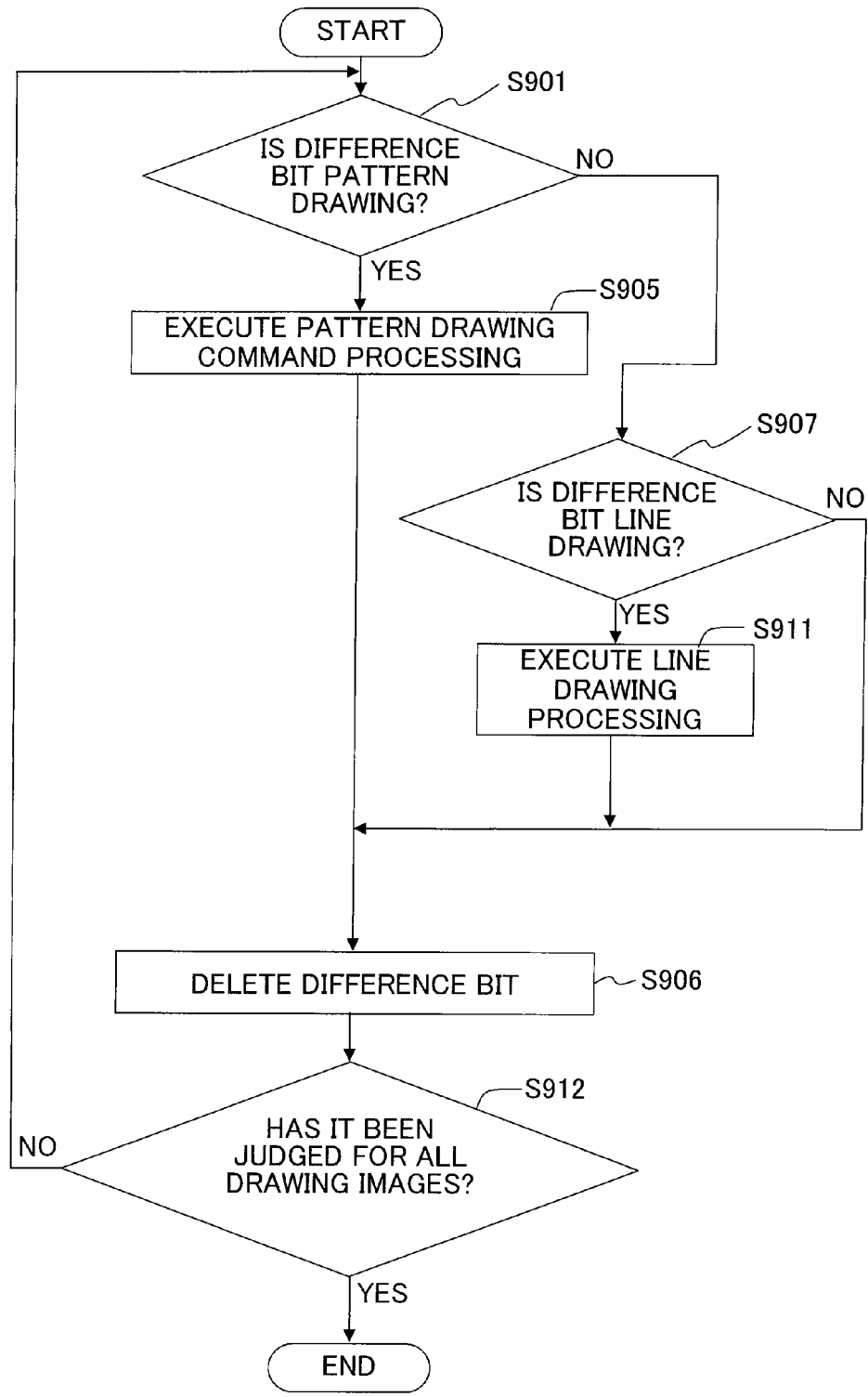
FIG. 12 is a flow chart in which a flow of a difference editing process in a second embodiment is shown.

In the second embodiment, the printing process with verification of print result basically being similar as in the first embodiment, a portion of the difference editing process which differs from the first embodiment will be described below while referring to FIG. 12.

Firstly, the CPU 31 makes a judgment of whether the difference bit is a pattern drawing (step S901). Concretely, the CPU 31 makes a judgment of whether the difference bit is a pattern drawing by comparing a characteristic value of the attribute drawing image corresponding to the difference bit. When the category judged from the characteristic value is a pattern drawing, the CPU 31 makes a judgment that there is a difference in the pattern drawing portion (YES at step S901), and executes the pattern drawing command processing (step S905). Further, the CPU 31 deletes the difference bit (step S906).

Whereas, when at step S901, the CPU 31 has made a judgment that there is no difference in the pattern drawing portion (NO at step 901), the CPU 31 makes a judgment of whether there is a difference in the line drawing portion (step S907). Concretely, the CPU 31 makes a judgment of whether it is a line drawing by comparing a characteristic value of the attribute drawing image corresponding to the difference bit. When the category is line drawing, the CPU 31 makes a judgment that there is a difference in the line drawing portion (YES at step S907), and executes the line drawing command processing (step S911). Then, the CPU 31 deletes the difference bit (step S906). Whereas, when the category of the portion having a difference is not the line drawing (NO at step S907), the CPU 31, without executing the line drawing command processing, deletes the difference bit (step S906).

Furthermore, when the CPU 31 has made a judgment of whether it is a pattern drawing or a line drawing for all the drawing images (YES at step S912), the CPU 31 terminates the difference editing process, and when the CPU 31 has not made a judgment of whether it is a pattern drawing or a line drawing for all the drawing images (NO at step S912), the process returns to step S901).

Therefore, in the image forming apparatus of the second embodiment, since the CPU 31 executes the pattern drawing command processing and the line drawing command processing without troubling the user, there is an improvement in convenience for the user.

Next, a third embodiment of the image forming apparatus according to the present invention will be described below. The image forming apparatus of the first embodiment and the second embodiment has been an embodiment in which, the pattern drawing command processing and the line drawing command processing are executed. However, in the image forming apparatus of the third embodiment, CPU 31 only displays a message recommending the execution of the pattern drawing command processing and the line drawing command processing, and does not executes the pattern drawing command processing and the line drawing command processing.

An operation of an image processing apparatus 30 in the third embodiment will be described below while referring to a printing process with verification of print result, by selecting appropriately only a process necessary for the preview process.

Figure 16:
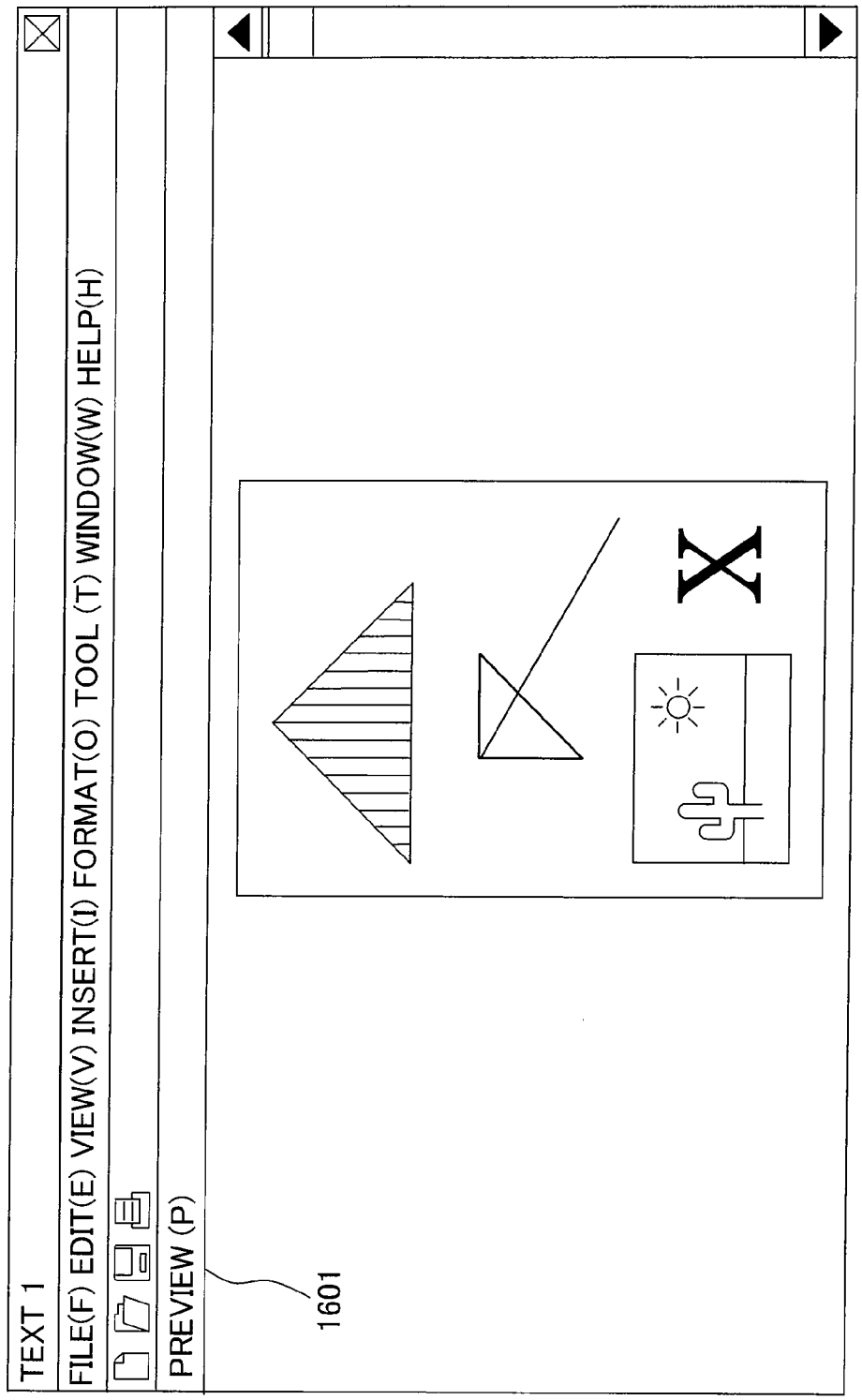
FIG. 16 is a concrete example of an add-on screen in the third embodiment.

The preview process starts as the CPU 31 detects that the user has pressed a preview button on the input section 42 shown in FIG. 16. Firstly, the CPU 31 acquires an application program preview shown in FIG. 4 (step S201), and carries out a process of generating drawing image data and attribute drawing image (step S203).

Next, the CPU 31 displays the drawing image data as a preview image on the display 41 (step S204). Then, the CPU 31 compares the application program preview and the drawing image data.

Further, the CPU 31 makes a judgment of whether there is a difference in the application program preview and the drawing image data (step S206). When the CPU 31 has made a judgment that there is no difference bit in the application program preview and the drawing image data (NO at step S206), the CPU 31 terminates the preview process.

Whereas, when the CPU 31 has made a judgment that there is a difference bit in the application program preview and the drawing image data (YES at step S206), the CPU 31 executes the difference editing process (step S207), and terminates the preview process.

In other words, in the preview process in the third embodiment, as compared to the printing process with verification of print result at step S202 in the first embodiment and the second embodiment, processes at steps S202, S208, and S209 are omitted.

Figure 13:
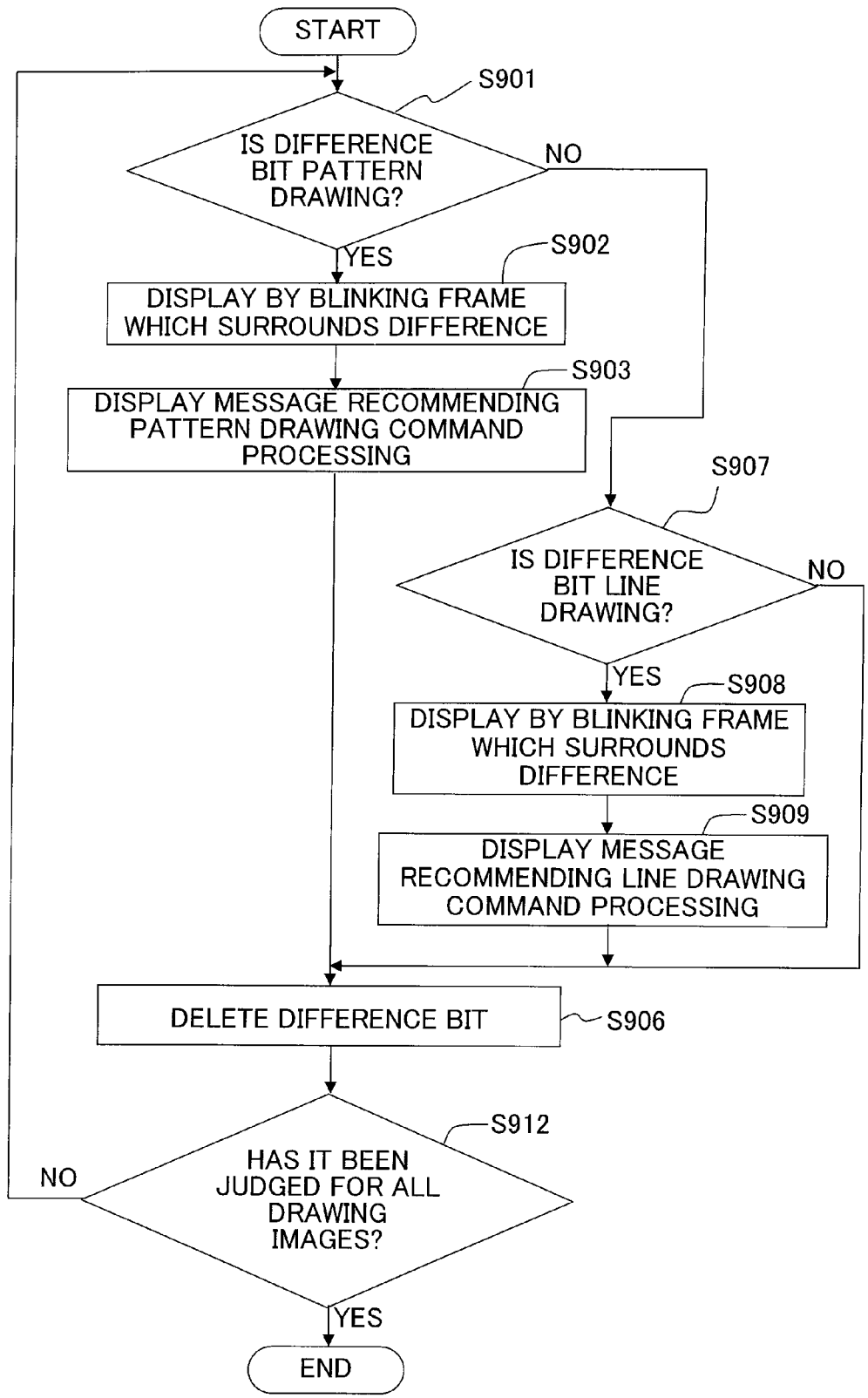
FIG. 13 is a flowchart in which a flow of a difference editing process in a third embodiment is shown.

Next, mainly a part of the difference editing process of the third embodiment which differs from the difference editing process of the first embodiment will be described below while referring to FIG. 13.

Figure 14:
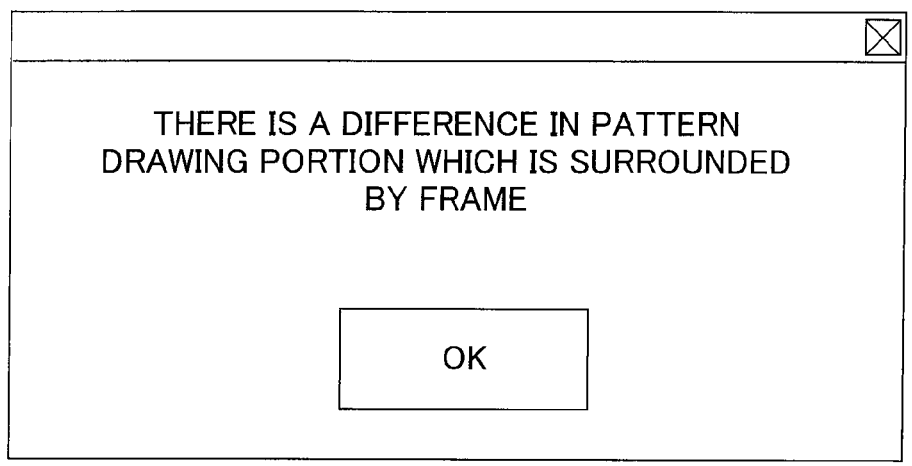
FIG. 14 is a concrete example of a pattern drawing message in the third embodiment.

Firstly, the CPU 31 makes a judgment of whether the difference bit is a pattern drawing (step S901). When the CPU 31 has judged that there is a difference in the pattern drawing portion (YES at step S901), at step S204, the CPU 31 surrounds an area around a position having a difference by a frame, from information of an image position which has been stored in the RAM 33 together with the information of "there is a difference", and makes a blinking display of the frame (step S902). Then, the CPU 31 displays a message which recommends the pattern drawing command processing on the display 41 (step S903). For instance, when the CPU 31 has displayed a message as in FIG. 14, and when the user has verified the message, the user selects "OK". When "OK" has been selected by the user, the CPU 31 deletes the difference bit (step S906).

Figure 15:
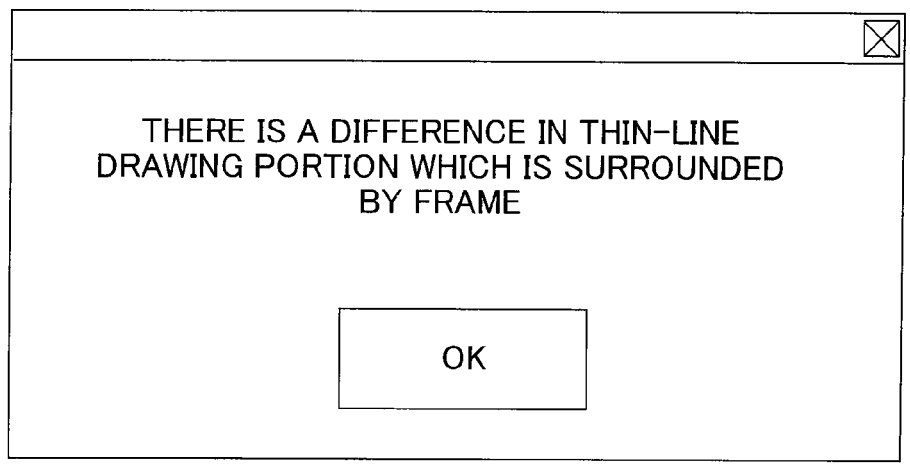
FIG. 15 is a concrete example of a thin-line drawing message in the third embodiment.

Whereas, when a judgment is made that there is no difference in the pattern drawing portion at step S901 (NO at step S901), the CPU 31 makes a judgment of whether there is a difference in the line drawing portion (step S907). When the CPU 31 has made a judgment that there is a difference in the line drawing portion (YES at step S907), at step S204, the CPU 31 surrounds an area around a position having a difference by a frame, from information of an image position which has been stored in the RAM 33 together with the information of "there is a difference", and makes a blinking display of the frame (step S902). Then, the CPU 31 displays a message which recommends the thin-line drawing command processing (step S909). For instance, when the CPU 31 has displayed a message as in FIG. 15, and when the user has verified the message, the user selects "OK". When "OK" has been selected by the user, the CPU 31 deletes the difference bit (step S906). Moreover, at step S907, when the judgment is made that there is no difference in the line drawing portion (NO at step S907), the CPU 31 deletes the difference bit (step S906).

Next, when the CPU 31 has made a judgment of whether it is a pattern drawing or a line drawing for all the drawing images (YES at step S912), the CPU 31 terminates the difference editing process, and when the CPU 31 has not made a judgment of whether it is a pattern drawing or a line drawing for all the drawing images, the process returns to step S901.

Therefore, in the image forming apparatus of the third embodiment, when there is a difference in the display data and the driver data, by the CPU 31 displaying on the display 41 that there is a difference, it is easy for the user to realize that there is a difference.

Moreover, when there is a difference, since a message recommending execution of a process for processing the drawing command is displayed, it is revealed that it is preferable for the user to execute the process for processing the drawing command.

Next, other embodiments of the present invention are described.

In the first embodiment, the second embodiment and the third embodiment (hereinafter, "embodiments from the first embodiment to the third embodiment"), an arrangement has been such that when a judgment has been made that there is a difference in a preview image of the application program and a preview image of the printer driver (YES at step S205), a frame surrounding the difference is subjected to blinking display (step S206). However, without restricting to the arrangement of making a blinking display of the frame surrounding the difference, only the difference may be displayed. Moreover, it may be displayed by some other method, and the preview image of the application program and the preview image of the drawing image data may be displayed alternately. Or, only a portion having a difference may be colored. Furthermore, an arrangement may be let to be such that a preview of any one of the application preview and the drawing image data may be displayed on the display 41, and the difference may be popped up, and when there is a difference between the application program preview and the drawing image data, a screen changes to an editing screen which is exclusively for the application program.

For the attribute drawing process, a characteristic value such as green, yellow, red, and blue may be assigned according to the category of the drawing image such as a pattern drawing image and a line drawing image, a picture, and characters. Or, without restricting to colors, numerical values such as 1, 2, 3, 4 may be assigned.

In the embodiments from the first embodiment to the third embodiment, when the interval between the two lines in the pattern is narrow, the interval between the two lines in the pattern is widened by the pattern drawing command processing. However, when the interval between the two lines in the pattern is wide, the interval between the two lines in the pattern may be narrowed.

In the embodiments from the first embodiment to the third embodiment, the line drawing command processing modifies a thin line to a thick line. However, a thick line may be modified to a thin line.

In the embodiments from the first embodiment to the third embodiment, the drawing command processing is restricted to the pattern drawing command processing and the line drawing command processing. However, an arrangement may be let to be such that another drawing command processing such as a character drawing command processing of processing a size, a typeface (lettering), and a thickness of characters, is provided.

In the embodiments from the first embodiment to the third embodiment, both the application program preview and the drawing image data are in a bit-map form. However, without restricting to the bit map, it may be a data of some other type such as JPEG (Joint Photographic Expert Group) format and TIFF (Tagged Image File Format).

In the embodiments from the first embodiment to the third embodiment, at step S207, the pattern drawing command processing and the line drawing command processing have been executed for each difference bit. However, when there is a difference bit, bit-map data of the drawing image data may be replaced by bit-map data of application program preview.

In the embodiments from the first embodiment to the third embodiment, the CPU 31 has been receiving a drawing command from the application program, and processing the drawing command by executing the pattern drawing command processing and the line drawing command processing. However, the CPU 31 may execute the pattern drawing command processing and the line drawing command processing for each drawing image of the drawing image data.

What is claimed is:

1. An information processing apparatus configured to connect to a printing apparatus which prints an image including a plurality of lines on a recording medium, the information processing apparatus comprising: a display; a processor; and memory storing computer-executable instructions that, when executed by the processor, cause the information processing apparatus to:
generates a drawing command identifying intervals of the lines of the image;
generate display data of the image to be displayed on the display, the display data including the lines of the image and being generated in a bit-map form based on the drawing command; generates driver data of the image to be transmitted to the printing apparatus, the driver data including the lines of the image and being generated in the bit-map form based on the drawing command; acquire the display data, acquire the driver data, and compare the display data and the driver data to judge whether there is a difference between the display data and the driver data; and when the judgment is that there is a difference between the display data and the driver data, display information indicating that there is a difference between the display data and the driver data on the display.

2. The information processing apparatus according to claim 1, wherein a user can edit the display data, displayed on the display.

3. The information processing apparatus according to claim 1, wherein the information that there is a difference between the display data and the driver data includes a frame surrounding an area including a position of the difference.

4. The information processing apparatus according to claim 3, wherein comparing of the display data and the driver data comprises comparing the display data and the driver data for each bit, and when there is a bit of which values are different between the display data and the driver data, judging that there is the difference.

5. The information processing apparatus according to claim 1, wherein the memory stores additional computer-executable instructions that, when executed by the processor, cause the information processing apparatus to execute a plurality of processes to edit the drawing command of the driver data.

6. The information processing apparatus according to claim 5, wherein the memory stores additional computer-executable instructions that, when executed by the processor, cause the information processing apparatus to select the processes to be executed; and determine a type of drawing of the display data, wherein the processes available for selection are changed according to the determined type of drawing.

7. The information processing apparatus according to claim 5, wherein the memory stores additional computer-executable instructions that, when executed by the processor, cause the information processing apparatus to: select the processes to be executed; determine a type of each drawing from among a plurality of drawings within the display data; and change the processes available for selection according to the determined type of each drawing.

8. The information processing apparatus according to claim 1, wherein the memory stores additional computer-executable instructions that, when executed by the processor, cause the information processing apparatus to display a message recommending an edited drawing command when the judgment is that there is a difference between the display data and the driver data.

9. The information processing apparatus according to claim 1, wherein the memory stores additional computer-executable instructions that, when executed by the processor, cause the information processing apparatus to change the drawing command to identify intervals of the lines of the image that are consistent with the intervals of the lines of the display data, respectively.

10. The information processing apparatus according to claim 1, wherein the memory stores additional computer-executable instructions that, when executed by the processor, cause the information processing apparatus to compare intervals of the lines of the display data and intervals of the lines of the driver data by comparing a bit structure of the display data and a bit structure of the driver data.

11. A computer-readable storage medium storing computer-executable instructions that, when executed by a processor, cause an information processing apparatus to: acquire display data including lines of an image;
acquire driver data including lines of an image;
compare the display data and the driver data to judge whether there is a difference between the display data and the driver data;
display an information indicating that there is a difference between the display data and the driver data on a display when the judgment is that there is a difference between the display data and the driver data; and compare intervals of the lines of the display data and intervals of the lines of the driver data by comparing a bit structure of the display data and a bit structure of the driver data.

* * * * *

UNITED STATES PATENT AND TRADEMARK OFFICE
CERTIFICATE OF CORRECTION

| | | |
|---|---|---|
| PATENT NO. | : 8,432,557 B2 | Page 1 of 1 |
| APPLICATION NO. | : 13/043997 | |
| DATED | : April 30, 2013 | |
| INVENTOR(S) | : Miyata | |

It is certified that error appears in the above-identified patent and that said Letters Patent is hereby corrected as shown below:

On the title page; In the Title:
Please delete "INFORMATION PROCESSING APPARATUS FOR IDENTIFYING DIFFERENCES BETWEEN DISPLAY DATA AND DRIVER DATA AND COMPUTE PROGRAM FOR INFORMATION PROCESSING APPARATUS" and insert
-- INFORMATION PROCESSING APPARATUS FOR IDENTIFYING DIFFERENCES BETWEEN DISPLAY DATA AND DRIVER DATA AND COMPUTER PROGRAM FOR INFORMATION PROCESSING APPARATUS --

In the Claims:

In Column 12, Claim 1, Line 44:
Please delete "generates" and insert -- generate --

In Column 12, Claim 1, Line 49:
Please delete "generates" and insert -- generate --

In Column 13, Claim 6, Line 16:
Please delete "to select the" and insert -- to: select the --

In Column 14, Claim 11, Line 20:
Please delete "data including" and insert -- data, including --

In Column 14, Claim 11, Line 21:
Please delete "data including" and insert -- data, including --

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,432,557 B2  Page 1 of 1
APPLICATION NO. : 13/043997
DATED : April 30, 2013
INVENTOR(S) : Miyata It is certified that error appears in the above-identified patent and that said Letters Patent is hereby corrected as shown below:

On the title page; and in the Specification, Column 1, Lines 1-5, In the Title:
Please delete "INFORMATION PROCESSING APPARATUS FOR IDENTIFYING DIFFERENCES BETWEEN DISPLAY DATA AND DRIVER DATA AND COMPUTE PROGRAM FOR INFORMATION PROCESSING APPARATUS" and insert
-- INFORMATION PROCESSING APPARATUS FOR IDENTIFYING DIFFERENCES BETWEEN DISPLAY DATA AND DRIVER DATA AND COMPUTER PROGRAM FOR INFORMATION PROCESSING APPARATUS --

In the Claims:

In Column 12, Claim 1, Line 44:
Please delete "generates" and insert -- generate --

In Column 12, Claim 1, Line 49:
Please delete "generates" and insert -- generate --

In Column 13, Claim 6, Line 16:
Please delete "to select the" and insert -- to: select the --

In Column 14, Claim 11, Line 20:
Please delete "data including" and insert -- data, including --

In Column 14, Claim 11, Line 21:
Please delete "data including" and insert -- data, including --

This certificate supersedes the Certificate of Correction issued September 30, 2014.

Signed and Sealed this
Twenty-first Day of October, 2014

Michelle K. Lee
*Deputy Director of the United States Patent and Trademark Office*